(12) United States Patent
Abdel-Rahman

(10) Patent No.: US 11,981,691 B1
(45) Date of Patent: *May 14, 2024

(54) 1,4-DIVINYLPHENYLENE-BRIDGED DIRUTHENIUM COMPLEX BEARING TWO Ru(CO)(2-MERCAPTOQUINOLATO)(PIPR3)2 MOIETIES AS AN ORGANIC CATALYST

(71) Applicant: KING FAISAL UNIVERSITY, Al-Ahsa (SA)

(72) Inventor: Obadah S. Abdel-Rahman, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,146

(22) Filed: Nov. 13, 2023

(51) Int. Cl.
| | | |
|---|---|---|
| *C07F 15/00* | (2006.01) | |
| *B01J 31/16* | (2006.01) | |
| *B01J 37/03* | (2006.01) | |
| *B01J 37/04* | (2006.01) | |
| *B01J 37/06* | (2006.01) | |

(52) U.S. Cl.
CPC ....... *C07F 15/0046* (2013.01); *B01J 31/1616* (2013.01); *B01J 37/031* (2013.01); *B01J 37/04* (2013.01); *B01J 37/06* (2013.01)

(58) Field of Classification Search
CPC .... C07F 15/0046; B01J 31/2291; B01J 31/20; B01J 31/24; B01J 37/009; B01J 37/0236; B01J 37/031; B01J 37/04; B01J 37/06
See application file for complete search history.

(56) References Cited

PUBLICATIONS

J. Maurer eta l., 25 Organometallics, 3701-3712 (2006) (Year: 2006).*
C. Barik et al., 889 Journal of Organometallic Chemistry, 40-44 (2019) (Year: 2019).*
J. Yin et al., 690 Journal of Organometallic Chemistry, 4265-4271 (2005) (Year: 2005).*
U. Pfaff et al., 22 Chemistry a European Journal, 783-801 (2016) (Year: 2016).*
O. Abdel-Rahman et al., 78 Z. Naturforsche., 75-93 (2023) (Year: 2023).*
O. Abdel-Rahman et al., 34 Organometallics, 3611-3628 (2015) (Year: 2015).*
Obadah S. Abdel-Rahman et al.; "1,4-Divinylphenylene-bridged diruthenium complexes with 2-hydroxypyridine- and 2- or 8-hydroxyquinoline-olate ligands"; From the journal Zeitschrift für Naturforschung B https://doi.org/10.1515/znb-2022-0303, Published by De Gruyter Mar. 8, 2023 (abstract only).
Ismail Warad et al.; "New catalysts for the chemoselective reduction of α,β-unsaturated ketones: Synthesis, spectral, structural and DFT characterizations of mixed ruthenium(II) complexes containing 2-ethene-1,3-bis(diphenylphosphino) propane and diamine ligands"; Polyhedron vol. 63, Oct. 31, 2013, pp. 182-188.
Jörg Maurer, et al.; "Divinylphenylene-Bridged Diruthenium Complexes Bearing Ru(CO)Cl(PiPr3)2 Entities"; Organometallics 2006, 25, 15, 3701-3712, Publication Date:Jun. 16, 2006 https://doi.org/10.1021/om0602660 Copyright © 2006 American Chemical Society.

* cited by examiner

*Primary Examiner* — Alexander R Pagano
(74) *Attorney, Agent, or Firm* — Nath, Goldberg & Meyer; Richard C. Litman

(57) ABSTRACT

A 1,4-divinylphenylene-bridged diruthenium complex bearing two Ru(CO)(2-mercaptoquinolato)(P$^i$Pr$_3$)$_2$ moieties, its synthesis, and its use as an catalyst in organic processes.

10 Claims, 2 Drawing Sheets

1,4-DIVINYLPHENYLENE-BRIDGED DIRUTHENIUM COMPLEX BEARING TWO Ru(CO)(2-MERCAPTOQUINOLATO)(PIPR3)2 MOIETIES AS AN ORGANIC CATALYST

BACKGROUND

1. Field

The present disclosure relates to a compound that is a 1,4-divinylphenylene-bridged diruthenium complex bearing two Ru(CO)(2-mercaptoquinolato)(P$^i$Pr$_3$)$_2$ moieties, its synthesis, and its use as a catalyst for organic compounds.

2. Description of the Related Art

Since the reporting of ruthenium hydrido complexes of the type {[HRu(CO)Cl(PR$_3$)$_2$] (R=Ph, Me, cyclohexyl, $^i$Pr)} in the 1960s, considerable interest has been focused on the pivotal catalytic activates of such chemical families towards selective hydrogenation of terminal olefins and alkynes, the coupling of terminal alkynes with carboxylic acid-derived compounds, the dehydrogenation of alcohol to ketones, dialdehydes to lactones, and in particular on regio- and stereospecific insertion of the ruthenium-hydride bond into a terminal —C≡CH bond of the alkyne substrates to form the ruthenium-alkenyl type-families.

More recently, interest in (multi)ruthenium-alkenyl type-complexes has been intensively scrutinized in terms of redox chemistry, electronic coupling, electro switchable poly-electrochromic near infrared (NIR) dyes, tri-, tetra-, and hexametal-organic macrocycles and antiproliferative effects in tumor cell lines.

As these complexes have attracted widespread interest, divinylarylene-bridged diruthenium complexes of the general type [{Ru(CO)(Cl)(P$^i$Pr$_3$)$_2$}$_2$(ρ-CH=CH—Ar—CH=CH—)] {Ar=bridging π-conjugated arylene linker} have been investigated and revealed to exhibit two consecutive, chemically and electrochemically, well-behaved, reversible one-electron oxidations at well-accessible potentials. The half-wave redox splitting, $\Delta E_{1/2}=E_{1/2}^{+/2+}-E_{1/2}^{0/+}$, between their two individual redox one-electron oxidations waves depends on the π-conjugated arylene linker "bridge" and can be ranged to be well-separated (strongly coupled) as in the case of five-membered 2,5-N-arylpyrroles- or -furanes- or -thiophenes heterocycles arylene linkers; moderately coupled as in 4,4'-biphenylenes, 2,2'-bipyridines, and many others arylene linkers; or weakly coupled as in the case of the enforced π-stacking of the two phenyl rings in para-[2.2]- or ortho-[2.1]-cyclophanes linkers.

Azoarylenes and its similar related derivatives were intensively investigated and attracted enormous interest due to their straightforward derivative synthesis step through classical homo-oxidative cross-coupling of aryl diazonium salts using Cu-catalyzed Sandmeyerstyle reactions. Moreover, these chromophores usually show a strong π→π* transition in the UV-Vis regime which can be predictively tuned by introducing substituents on the aryl rings.

SUMMARY

The electrochemical electronic coupling, polyelectrochromic behavior, and spectro(electro)scopic features of bis (ruthenium-alkenyl) moieties incorporated into an azoarylene bridge linker have been investigated as described herein. Accordingly, the present subject matter relates to a novel 1,4-divinylphenylene-bridged diruthenium complex bearing two Ru(CO)(2-mercaptoquinolato)(P$^i$Pr$_3$)$_2$ moieties with the general formula [{Ru(CO)(2-mercaptoquinolato)(P$^i$Pr$_3$)$_2$}$_2$(μ-CH=CH—C$_6$H$_4$—CH=CH-1,4)]. This six-coordinated, octahedaral, bis(ruthenium-alkenyl) type-complex [{Ru(CO)(2-mercaptoquinolato)(P$^i$Pr$_3$)$_2$}$_2$(μ-CH=CH—C$_6$H$_4$—CH=CH-1,4)] was classically prepared in high yields by substitution of the chloro ligands of the precursor complex [{Ru(CO)Cl(P$^i$Pr$_3$)$_2$}$_2$(μ-CH=CH—C$_6$H$_4$—CH=CH-1,4)] with the corresponding deprotonated 2-mercaptoquinoline in a CH$_2$Cl$_2$/MeOH solvent mixture according to a routine protocol in a stoichiometric ratio of 1:2.

The complex [{Ru(CO)Cl(P$^i$Pr$_3$)$_2$}$_2$(μ-CH=CH—C$_6$H$_4$—CH=CH-1,4)] may be routinely characterized in a neutral state by classical IR, UV/Vis and NMR spectroscopy techniques, and in two different reachable oxidized states by IR, UV/Vis/NIR spectro-electrochemistry along with electrochemical techniques. The complex [{Ru(CO)Cl(P$^i$Pr$_3$)$_2$}$_2$(μ-CH=CH—C$_6$H$_4$—CH=CH-1,4)] undergoes two consecutive, chemically and electrochemically, well-behaved, reversible one-electron oxidations at well-accessible potentials with a half-wave redox splitting of $\Delta E_{1/2}=315$ mV referring to strong electronic coupling "communication" between the two bis(ruthenium-alkenyl) moieties. The results on the complex [{Ru(CO)Cl(P$^i$Pr$_3$)$_2$}$_2$(μ-CH=CH—C$_6$H$_4$—CH=CH-1,4)] show dominant contributions of the x-conjugated divinylphenylene bridge to the two redox processes and an even delocalization of the electron hole and spin density over the entire x-conjugated divinylphenylene diruthenium backbone with only minor involvement of the peripherally attached κ $^2$[N,S]$^-$ donor ligands. The complex [{Ru(CO)(2-mercaptoquinolato)(P$^i$Pr$_3$)$_2$}$_2$(μ-CH=CH—C$_6$H$_4$—CH=CH-1,4)] also shows strong polyelectrochromic behavior with at least three distinct states with remarkable activity as homogeneous catalyst for applicable chemical manufactories of organic compounds syntheses.

In an embodiment, the present subject matter relates to a 1,4-divinylphenylene-bridged diruthenium complex bearing two Ru(CO)(2-mercaptoquinolato)(P$^i$Pr$_3$)$_2$ moieties having the formula I:

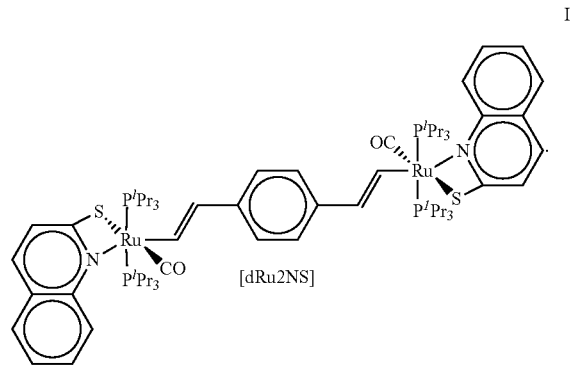

In another embodiment, the present subject matter relates to a compound that is a yellow solid.

In a further embodiment, the present subject matter relates to a metallic complex that may act as a catalyst.

In one more embodiment, the present subject matter relates to a method of making the 1,4-divinylphenylene-bridged diruthenium complex bearing two Ru(CO)(2-mercaptoquinolato)(P$^i$Pr$_3$)$_2$ moieties, the method comprising: adding a first reaction mixture to a solution of a complex

[{Ru(CO)Cl(P$^i$Pr$_3$)$_2$}$_2$(μ-CH=CH—C$_6$H$_4$—CH=CH-1,4)] in CH$_2$Cl$_2$ to obtain a second reaction mixture; stirring the second reaction mixture for at least about 1 hour to obtain a precipitate; removing the solvent under reduced pressure to obtain a precipitate; washing the precipitate; drying the precipitate; and obtaining the 1,4-divinylphenylene-bridged diruthenium complex bearing two Ru(CO)(2-mercaptoquinolato)(P$^i$Pr$_3$)$_2$ moieties.

These and other features of the present subject matter will become readily apparent upon further review of the following specification.

DETAILED DESCRIPTION OF THE PREFERRED EMBODIMENTS

Figure 1:
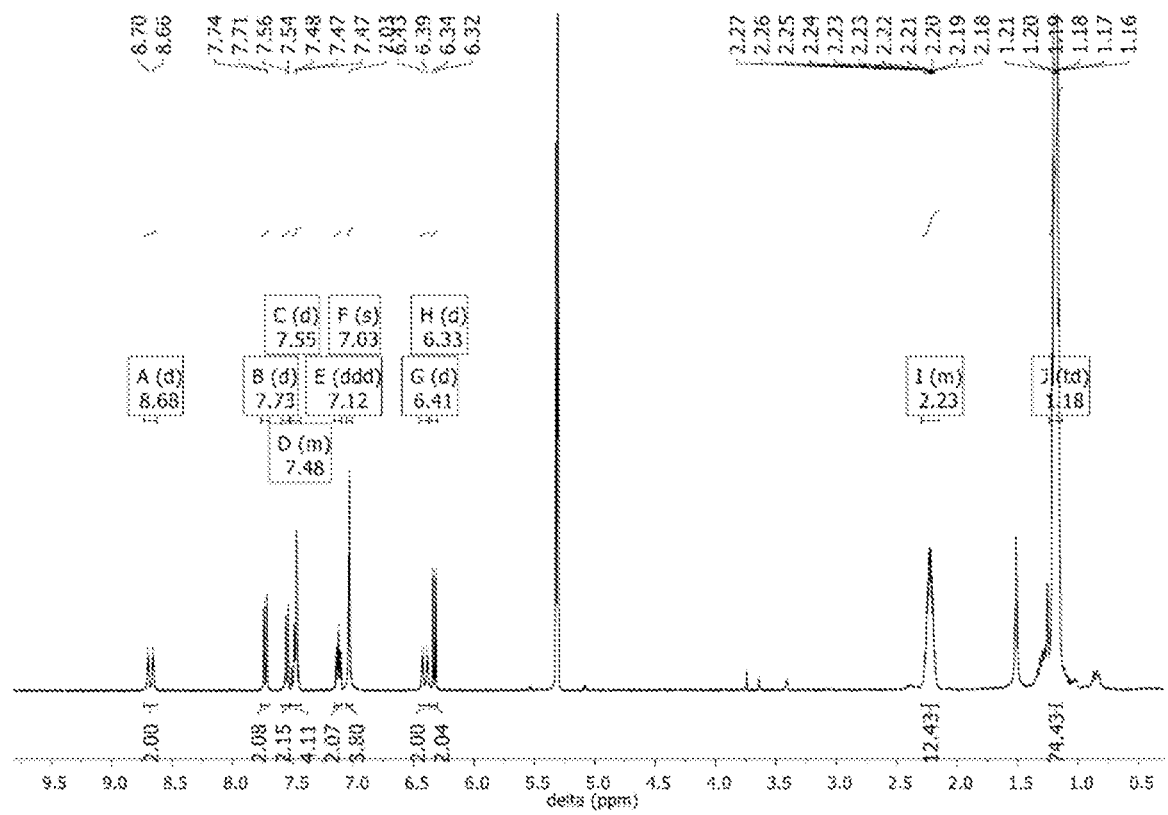
FIG. 1 shows $^1$H-NMR analysis spectrum of complex [{Ru(CO)(2-mercaptoquinolato)(P$^i$Pr$_3$)$_2$}$_2$(μ-CH=CH—C$_6$H$_4$—CH=CH-1,4)]

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a novel 1,4-divinylphenylene-bridged diruthenium complex bearing two Ru(CO)(2-mercaptoquinolato)(P$^i$Pr$_3$)$_2$ moieties with the general formula [{Ru(CO)(2-mercaptoquinolato)(P$^i$Pr$_3$)$_2$}$_2$(μ-CH=CH—C$_6$H$_4$—CH=CH-1,4)].

This six-coordinated, octahedral, 18-VEs type-complex [{Ru(CO)(2-mercaptoquinolato)(P$^i$Pr$_3$)$_2$}$_2$(μ-CH=CH—C$_6$H$_4$—CH=CH-1,4)] has been successfully prepared in high yields by substitution of the chloro ligands of the precursor complex [{Ru(CO)Cl(P$^i$Pr$_3$)$_2$}$_2$(μ-CH=CH—C$_6$H$_4$—CH=CH-1,4)] with the corresponding deprotonated 2-mercaptoquinoline in a CH$_2$Cl$_2$/MeOH solvent mixture. The complex [{Ru(CO)(2-mercaptoquinolato)(P$^i$Pr$_3$)$_2$}$_2$(μ-CH=CH—C$_6$H$_4$—CH=CH-1,4)] was routinely characterized in the neutral state by classical IR, UV/Vis and NMR spectroscopy techniques, and in its two different reachable oxidized states by IR, UV/Vis/NIR spectroelectrochemistry along with electrochemical techniques. The 1,4-divinylphenylene-bridged diruthenium complex bearing two Ru(CO)(2-mercaptoquinolato)(P$^i$Pr$_3$)$_2$ moieties may function as a catalyst in organic processes.

The product can be acquired in exceptional yields (average about 89%) by substitution of the chloro ligands of the precursor complex [{Ru(CO)Cl(P$^i$Pr$_3$)$_2$}$_2$(μ-CH=CH—C$_6$H$_4$—CH=CH-1,4)] with the corresponding deprotonated 2-mercaptoquinoline in a CH$_2$Cl$_2$/MeOH solvent mixture. The reaction components could be purified by some non-chromatographic techniques. The product can be analyzed using spectral data; IR, NMR & elemental analysis. The prepared compound can be used as a catalyst for organic processes.

In an embodiment, the present subject matter relates to a 1,4-divinylphenylene-bridged diruthenium complex bearing two Ru(CO)(2-mercaptoquinolato)(P$^i$Pr$_3$)$_2$ moieties having the formula I:

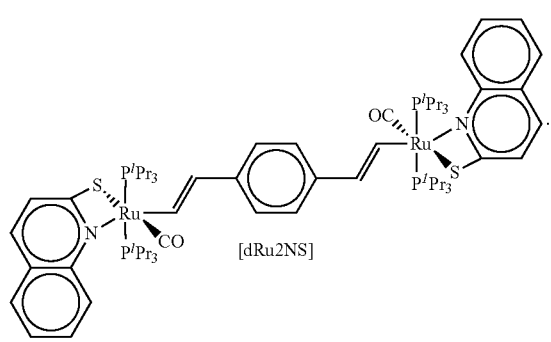

[dRu2NS]

In certain embodiments, the 1,4-divinylphenylene-bridged diruthenium complex bearing two Ru(CO)(2-mercaptoquinolato)(P$^i$Pr$_3$)$_2$ moieties can be obtained as a yellow solid.

In another embodiment, the present subject matter relates to a catalyst for organic reactions and processes.

In one more embodiment, the present subject matter relates to a method of making the 1,4-divinylphenylene-bridged diruthenium complex bearing two Ru(CO)(2-mercaptoquinolato)(P$^i$Pr$_3$)$_2$ moieties, the method comprising: stirring 2-mercaptoquinoline and K$_2$CO$_3$ in a solvent of CH$_2$Cl$_2$ and MeOH to obtain a first reaction mixture; adding the first reaction mixture to a solution of a complex [{Ru(CO)Cl(P$^i$Pr$_3$)$_2$}$_2$(μ-CH=CH—C$_6$H$_4$—CH=CH-1,4)] in CH$_2$Cl$_2$ to obtain a second reaction mixture; stirring the second reaction mixture for at least about 1 hour to obtain a precipitate; removing the solvent under reduced pressure to obtain a precipitate; washing the precipitate; drying the precipitate; and obtaining the 1,4-divinylphenylene-bridged diruthenium complex bearing two Ru(CO)(2-mercaptoquinolato)(P$^i$Pr$_3$)$_2$ moieties.

The present production methods can be further seen by referring to the following Scheme 1:

Scheme 1

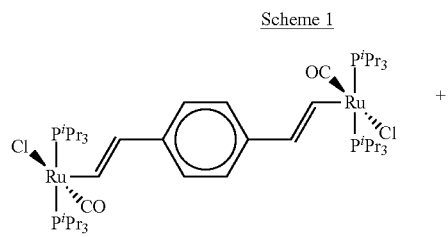

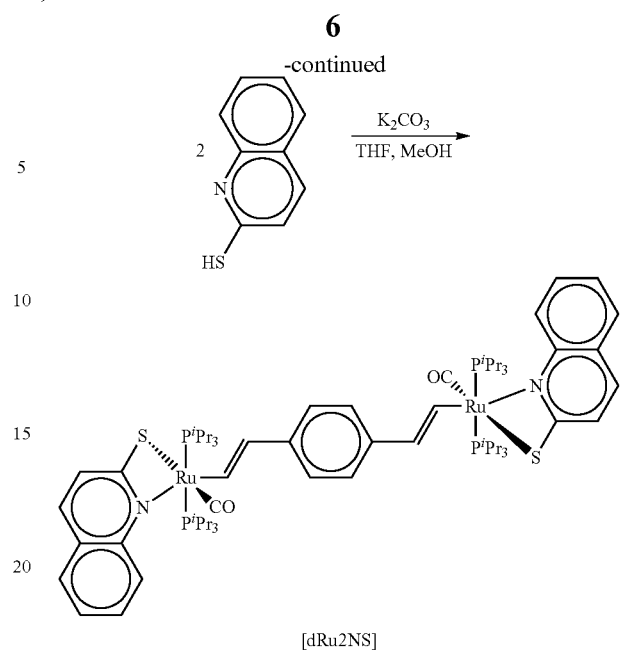

[dRu2NS]

In an embodiment of the present production methods, the crude precipitate can be yellow.

In another embodiment of the present production methods, the precipitate can be washed with n-hexane and MeOH.

In a further embodiment of the present production methods, the precipitate can be dried in a vacuum.

In another embodiment of the present production methods, washing the precipitate may remove unreacted starting materials and formed KCl.

In a further embodiment of the present production methods, the 2-mercaptoquinoline and K$_2$CO$_3$ may be added in equimolar amounts.

In another embodiment of the present production methods, the 1,4-divinylphenylene-bridged diruthenium complex bearing two Ru(CO)(2-mercaptoquinolato)(P$^i$Pr$_3$)$_2$ moieties can be obtained as a yellow solid.

In an additional embodiment of the present production methods, the 1,4-divinylphenylene-bridged diruthenium complex bearing two Ru(CO)(2-mercaptoquinolato)(P$^i$Pr$_3$)$_2$ moieties can be obtained in an about 89% yield.

The following examples relate to various methods of manufacturing the specific compounds and application of the same, as described herein. All compound numbers expressed herein are with reference to the synthetic pathway figures shown above.

EXAMPLES

Example 1

Preparation of 1,4-Divinylphenylene-Bridged Diruthenium Complex Bearing Two Ru(CO)(2-Mercaptoquinolato)(P$^i$Pr$_3$)$_2$ Moieties 0.8 mmol of 2-mercaptoquinoline and equimolar amounts of K$_2$CO$_3$ (111 mg, 0.8 mmol, 2.2 eq.) were stirred at room temperature in a solvent mixture of 10 mL of CH$_2$Cl$_2$ and 10 mL of MeOH for 30 min. This solution was slowly added via cannula to a solution of 395 mg (0.36 mmol, 1 eq.) of the complex [{Ru(CO)Cl(P$^i$Pr$_3$)$_2$}$_2$(μ-CH=CH—C$_6$H$_4$—CH=CH-1,4)] in 10 mL of CH$_2$Cl$_2$. After complete addition, stirring was continued for one further hour at room temperature to give a deep yellow solution. The solvents were removed under reduced pressure and the yellow precipitate was washed twice with 15 ml of n-hexane and 15 ml of MeOH each to remove unreacted starting material and the formed KCl. The resulting residue was then dried in vacuum. 0.8 mmol, 2.2 eq. of 2-mercaptoquinoline yielded 425 mg (0.32 mmol, 89%) of complex [{Ru(CO)(2-mercaptoquinolato)(P$^i$Pr$_3$)$_2$}$_2$(μ-CH=CH—C$_6$H$_4$—CH=CH-1,4)]

Figure 2:
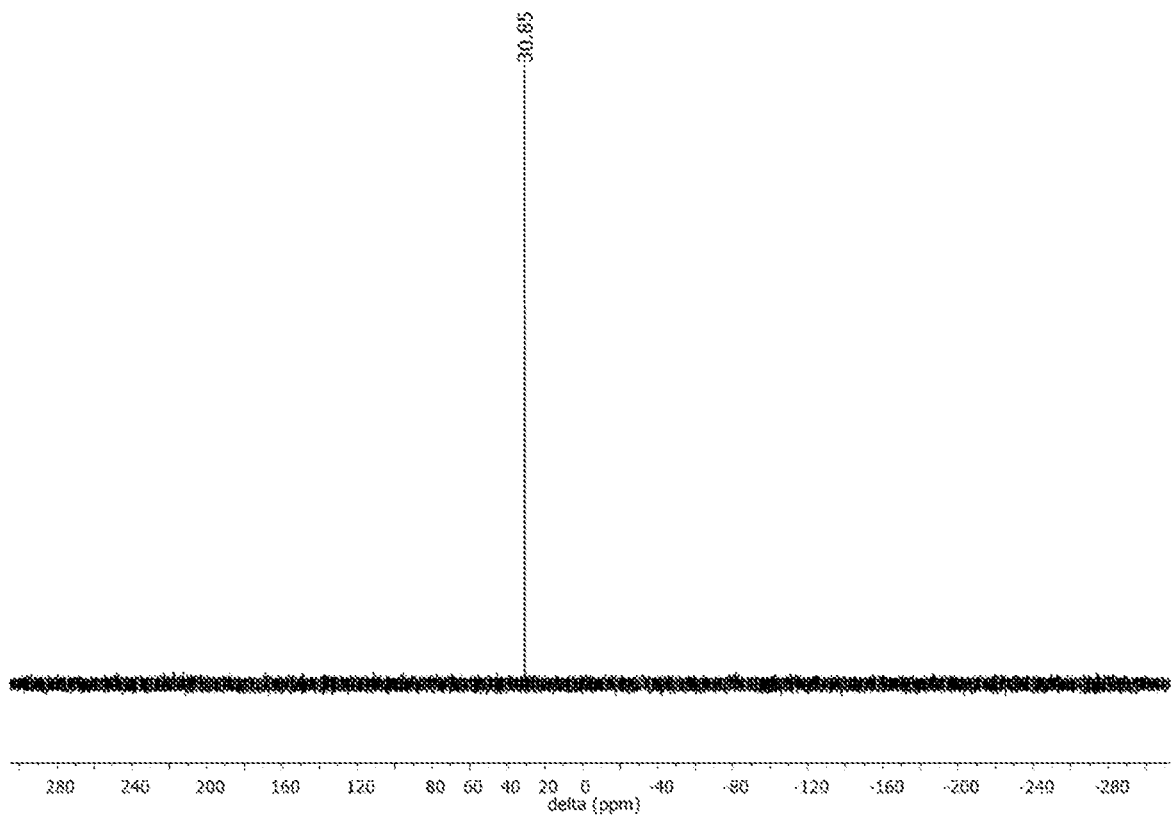
FIG. 2 shows $^{31}$P-NMR analysis (162 MHz, CD$_2$Cl$_2$) of complex [{Ru(CO)(2-mercaptoquinolato)(P$^i$Pr$_3$)$_2$}$_2$(μ-CH=CH—C$_6$H$_4$—CH=CH-1,4)].

Characterization of the prepared compound was determined using $^1$H NMR and $^{31}$P-NMR as shown in FIGS. 1 and 2, respectively. The elemental analysis can be seen as follows.

Elemental analysis calculated for C$_{66}$H$_{104}$N$_2$O$_2$S$_2$P$_4$Ru$_2$: C: 58.82; H: 7.78; N: 2.08; S: 4.76. Found C: 58.57%; H: 7.95%; N: 2.09%; S: 4.68. IR (ATR, v in cm-1): 2950, 2930 (C—H aryl, vinyl), 1880 Ru(C≡O), 1585 (C=N), 1560, 1500 (C=C vinyl, aryl). UV/Vis ($\lambda_{max}$ (nm), ε (M$^{-1}$·cm$^{-1}$)): 350 (1.7×10$^4$; 450, 1.6×10$^4$).

$^1$H-NMR as depicted in FIG. 1 (400 MHz, CD$_2$Cl$_2$): δ: 8.68 (d, 2H, $^3J_{H-H}$=16.1 Hz, H$_{(1)}$), 7.73 (d, 2H, $^3J_{H-H}$=9.0 Hz, H$_{(7)}$), 7.55 (d, 2H, $^3J_{H-H}$=7.9 Hz, H$_{(9)}$), 7.52 (dd, 2H, $^3J_{H-H}$=8.3 Hz, $^3J_{H-H}$=5.9 Hz, H$_{(11)}$), 7.48 (d, 2H, $^3J_{H-H}$=8.3 Hz, H$_{(12)}$), 7.12 (ddd, 2H, $^3J_{H-H}$=7.9 Hz, $^3J_{H-H}$=5.9 Hz, $^4J_{H-H}$=2.1 Hz, H$_{(10)}$), 7.02 (s, 4H, H$_{(4)}$), 6.41 (d, 2H, $^3J_{H-H}$=16.1 Hz, H$_{(2)}$), 6.33 (d, 2H, $^3J_{H-H}$=9.0 Hz, H$_{(6)}$), 2.23 (m, 12H, PCHCH$_3$), 1.20 (m, 72H, PCHCH$_3$) ppm.

$^{31}$P-NMR as depicted in FIG. 2 (162 MHz, CD$_2$Cl$_2$): δ: 30.85 (s, P$^i$Pr$_3$) ppm. $^{13}$C{$^1$H}-NMR (151 MHz, CD$_2$Cl$_2$): δ 209.2 (t, $^2J_{C-P}$=12.5 Hz, C$_{(14)}$), 177.1 (t, $^2J_{C-P}$=7.2 Hz, C(1)), 173.2 (t, $^3J_{C-P}$=1.6 Hz, C(5)), 148.5 (s, C(13)), 145.1 (s, C(3)), 138.2 (s, C(7)), 133.1 (t, $^3J_{C-P}$=2.3 Hz, C(2)), 131.5 (s, C(11)), 127.5 (s, C(9)), 125.6 (s, C(8)), 124.8 (s, C(4)), 121.2 (s, C(12)), 120.4 (s, C(10)), 115.3 (s, C(6)), 25.4 (t, $^2J_{C-P}$=9.5 Hz, CH(CH$_3$)$_2$), 20.5 and 19.8 (s, (CH$_3$)$_2$CH) ppm.

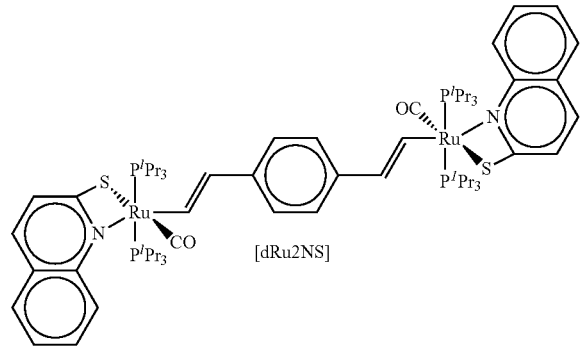

Example 2

NMR Characterization

NMR Characterization

To investigate the electrochemical electronic coupling, polyelectrochroic behavior, catalytic activity and spectro (electro)scopic features of bis(ruthenium-alkenyl) moieties incorporated into 1,4-divinylphenylene-bridge linker terminated with deprotonated, 2-mercaptoquinolato as monoanionic, chelating, bidentate co-ligands. We have successfully prepared a novel [{Ru(CO)(2mercaptoquinolato)(P$^i$Pr$_3$)$_2$}$_2$ (μ-CH=CH—C$_6$H$_4$—CH=CH-1,4)], [{Ru(CO)Cl(P$^i$Pr$_3$)$_2$}$_2$(μ-CH=CH—C$_6$H$_4$—CH=CH-1,4)] complex as depicted in Scheme 1 previously illustrated.

This six-coordinated, octahedaral, bis(ruthenium-alkenyl) type-complex [dRu2NS] was classically prepared by in high yields by substitution of the chloro ligands of the precursor complex [{Ru(CO)(2-mercaptoquinolato)(P$^i$Pr$_3$)$_2$}$_2$(μ-CH=CH—C$_6$H$_4$—CH=CH-1,4)] with the corresponding deprotonated 2-mercaptoquinoline in a CH$_2$Cl$_2$/MeOH solvent mixture according to a routine protocol in a stoichiometric ratio of 1:2. Upon addition of the solution of the deprotonated chelate 2-mercaptoquinoline, the reaction solution color changed promptly from red to deep yellow with the concomitant precipitation of KCl. [{Ru(CO)(2-mercaptoquinolato)(P$^i$Pr$_3$)$_2$}$_2$(μ-CH=CH—C$_6$H$_4$—CH=CH-1,4)] was routinely characterized in their neutral state by conventional IR, UV/Vis and NMR spectroscopy and analytical techniques, and in its two different reachable oxidized states by IR, UV/Vis/NIR spectroelectrochemistry.

$^{31}$P-NMR spectrum of the complex [{Ru(CO)(2-mercaptoquinolato)(P$^i$Pr$_3$)$_2$}$_2$(μ-CH=CH—C$_6$H$_4$—CH=CH-1, 4)], likewise other ruthenium-alkenyl of similar family, showed a sharp singlet resonance at δ=30.9 ppm, confirming that the four P$^i$Pr$_3$ ligands are chemically equivalent in which two of them are trans-disposed at each {Ru} end-groups. $^1$H-NMR spectrum shows classical doublet at δ 8.68 ppm and doublet of triplet at δ 6.41 ppm of the four equivalent vinylic protons Ru—CH=(H$_1$) and Ru—CH=CH (H$_2$) with a large coupling constant $^3J_{H-H}$ of about 13.1 Hz, respectively. This high coupling constant confirms a trans-geometry at the two vinylic double bonds. $^{13}$C-NMR spectrum of complex [{Ru(CO)(2-mercaptoquinolato)(P$^i$Pr$_3$)$_2$}$_2$(μ-CH=CH—C$_6$H$_4$—CH=CH-1,4)] shows classical olefinic signals of the two equivalent α- and β-vinylic carbons with two triplets at δ 177.1 ppm for Ru—C=(C$_1$) and at δ 133.1 ppm for Ru—C=C (C$_2$) with a $^2J_{P-C}$ or $^3J_{P-C}$ coupling constant of about 10.5 or 2.3 Hz. Another characteristic triplet signal at δ 209.2 ppm with a $^2J_{P-C}$ coupling constant of about 12.0 Hz is assigned to the carbonyl carbon.

Electrochemistry

The redox behavior of 1,4-divinylphenylene-bridged diruthenium complex [dRu2NS] was initially scrutinized by cyclic voltammetry (CV) and square-wave voltammetry (SWV) techniques to probe the electrochemical properties and the extend of the electronic interaction (coupling) between the two ruthenium vinyl moieties. The experiments were performed in CH$_2$Cl$_2$/n-NBu$_4$$^+$PF$^-$ (0.1 M) as the supporting electrolyte. The CV and SWV of the complex [{Ru(CO)(2-mercaptoquinolato)(P$^i$Pr$_3$)$_2$}$_2$(μ-CH=CH—C$_6$H$_4$—CH=CH-1,4)] in n-NBu$_4$$^+$PF$^-$ was recorded at a sweep rate of 0.1 V/s at r.t. versus the CP$_2$Fe$^{0/+}$ reference couple. Complex [dRu2NS] undergoes two consecutive, chemically and electrochemically, well-behaved, reversible one-electron oxidations at well-accessible potentials. The half-wave redox splitting, $\Delta E_{1/2}=E_{1/2}^{+/2+}-E_{1/2}^{0/+}$, between their two individual redox one-electron $\Delta E_{1/2}$=315 mV referring to strong electronic coupling "communication" between the two bis(ruthenium-alkenyl) moieties.

IR Spectro-Electrochemistry

IR spectroelectrochemistry (SEC) is a quantitative and an informative tool used in this study to get a crucial insight into the ruthenium—versus divinylphenylene bridge-based character of the individual redox processes. This can be fulfilled via investigating the changes in the energies and the band patterns for the degree of metal dπ/π*(CO) backbonding upon accessible sequential oxidations, since those remarkable tokens are considered as an indicative measure of altering the electron density at the two rutheniumvinyl moieties. Complex [{Ru(CO)(2-mercaptoquinolato)(P$^i$Pr$_3$)$_2$}$_2$(μ-CH═CH—C$_6$H$_4$—CH═CH-1,4)] in its neutral state, shows classical intense vibrational bands at around 2900, 1880, 1550 cm$^{-1}$ assigned to the C—H(aryl, alkyl), Ru(C≡O), and C═C(vinyl, aryl) stretches, respectively. This low energy of the v (CO) stretch band reflects, however, the high electron density at the two ruthenium-alkenyl moieties. First and second oxidations of complex [{Ru(CO)(2-mercaptoquinolato)(P$^i$Pr$_3$)$_2$}$_2$(μ-CH═CH—C$_6$H$_4$—CH═CH-1,4)] cleanly converted the neutral from to its corresponding mono- and di-cation in a stepwise fashion as indicated by distinct sets of isosbestic points. As a general scenario in stepwise fashion oxidation to the first radical cations of complex [{Ru(CO)(2-mercaptoquinolato)(P$^i$Pr$_3$)$_2$}$_2$(μ-CH═CH—C$_6$H$_4$—CH═CH-1,4)] led to replace the neutral Ru(CO) band at 1888 cm$^{-1}$ into a high a blue shift band at 1913 cm$^{-1}$ with a weak shoulder at 1927 cm$^{-1}$. As the oxidation proceeded to the di-cation, the two CO bands of mixed-valent (MV) complex [{Ru(CO)(2-mercaptoquinolato)(P$^i$Pr$_3$)$_2$}$_2$(μ-CH═CH—C$_6$H—CH═CH-1,4)]$^+$ are again blued-shifted and merged into a single band at 1961 cm$^{-1}$. This typical observation pattern confirms a strongly coupled Class III system of Robin-Day classification of MV states.

UV/Vis/NIR Spectroelectrochemistry

Likewise all five-coordinated bis(ruthenium-alkenyl) complexes of the type {Ru}-arylene-{Ru} ({Ru}={Ru(CO)Cl(P$^i$Pr$_3$)$_2$(CH═CH)}), complex [{Ru(CO)(2-mercaptoquinolato)(P$^i$Pr$_3$)$_2$}$_2$(μ-CH═CH—C$_6$H$_4$—CH═CH-1,4)], features a main intense absorption UV-band at 345 nm which attributed to a π→π* transitions within the extended metal-organic divinylarylene bridge chromophore. Electrochemical oxidation was achieved by applying appropriate positive potentials to the complex [{Ru(CO)(2-mercaptoquinolato)(P$^i$Pr$_3$)$_2$}$_2$(μ-CH═CH—C$_6$H—CH═CH-1,4)] in NBu$_4^+$ PF6$^-$/CH$_2$Cl$_2$ in the UV/Vis/NIR regimes. Upon the first oxidation, the intensity of the UV-band of the neutral complex collapsed with the concomitant of growth of new intense band at the border of Vis/NIR region at 800 nm and strong NIR band between 1200 to 1600 nm. The NIR band is assigned to a π→π* transition within an open-shell, extended π-system. As the oxidation proceeded to the di-cation [{Ru(CO)(2-mercaptoquinolato)(P$^i$Pr$_3$)$_2$}$_2$(μ-CH═CH—C$_6$H$_4$—CH═CH-1,4)]$_2^+$, both bands of [{Ru(CO)(2-mercaptoquinolato)(P$^i$Pr$_3$)$_2$}$_2$(μ-CH═CH—C$_6$H—CH═CH-1,4)]$^+$ are disappeared and growth of new band is visible region. Thus complex [{Ru(CO)(2-mercaptoquinolato)(P$^i$Pr$_3$)$_2$}$_2$(μ-CH═CH—C$_6$H$_4$—CH═CH-1,4)] shows strong electrochromic behavior with at least three distinct states, as each individual oxidations are accompanied by the growth of intense absorption bands in the near infrared (NIR) and/or the visible (Vis) regime of electromagnetic radiation It is to be understood that the 1,4-divinylphenylene-bridged diruthenium complex bearing two Ru(CO)(2-mercaptoquinolato)(P$^i$Pr$_3$)$_2$ moieties, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A 1,4-divinylphenylene-bridged diruthenium complex bearing two Ru(CO)(2-mercaptoquinolato)(P$^i$Pr$_3$)$_2$ moieties having the formula I:

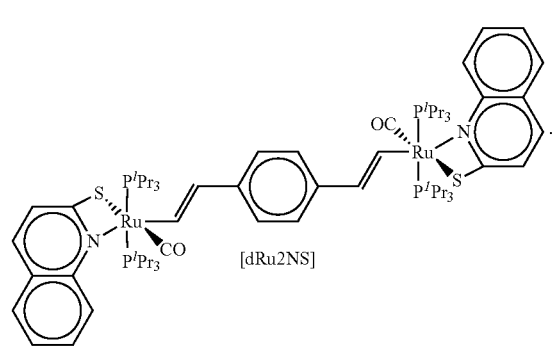

2. The 1,4-divinylphenylene-bridged diruthenium complex bearing two Ru(CO)(2-mercaptoquinolato)(P$^i$Pr$_3$)$_2$ moieties of claim 1, wherein the compound is obtained as a yellow solid.

3. A method of making the 1,4-divinylphenylene-bridged diruthenium complex bearing two Ru(CO)(2-mercaptoquinolato)(P$^i$Pr$_3$)$_2$ moieties of claim 1, the method comprising:
    stirring 2-mercaptoquinoline and K$_2$CO$_3$ in a solvent of CH$_2$Cl$_2$ and MeOH to obtain a first reaction mixture;
    adding the first reaction mixture to a solution of a complex [{Ru(CO)Cl(P$^i$Pr$_3$)$_2$}$_2$(μ-CH═CH—C$_6$H$_4$—CH═CH-1,4)] in CH$_2$Cl$_2$ to obtain a second reaction mixture;
    stirring the second reaction mixture for at least about 1 hour to obtain a precipitate;
    removing the solvent under reduced pressure to obtain a precipitate;
    washing the precipitate;
    drying the precipitate; and
    obtaining the 1,4-divinylphenylene-bridged diruthenium complex bearing two Ru(CO)(2-mercaptoquinolato)(P$^i$Pr$_3$)$_2$ moieties.

4. The method of making the 1,4-divinylphenylene-bridged diruthenium complex bearing two Ru(CO)(2-mercaptoquinolato)(P$^i$Pr$_3$)$_2$ moieties of claim 3, wherein the crude precipitate is yellow.

5. The method of making the 1,4-divinylphenylene-bridged diruthenium complex bearing two Ru(CO)(2-mercaptoquinolato)(P$^i$Pr$_3$)$_2$ moieties of claim 3, wherein the precipitate is washed with n-hexane and MeOH.

6. The method of making the 1,4-divinylphenylene-bridged diruthenium complex bearing two Ru(CO)(2-mercaptoquinolato)(P$^i$Pr$_3$)$_2$ moieties of claim 3, wherein washing the precipitate removes unreacted starting materials and formed KCl.

7. The method of making the 1,4-divinylphenylene-bridged diruthenium complex bearing two Ru(CO)(2-mercaptoquinolato)(P$^i$Pr$_3$)$_2$ moieties of claim 3, wherein the precipitate is dried in a vacuum.

8. The method of making the 1,4-divinylphenylene-bridged diruthenium complex bearing two Ru(CO)(2-mercaptoquinolato)(P$^i$Pr$_3$)$_2$ moieties of claim 3, wherein the 2-mercaptoquinoline and K$_2$CO$_3$ are added in equimolar amounts.

9. The method of making the 1,4-divinylphenylene-bridged diruthenium complex bearing two $Ru(CO)(2$-mercaptoquinolato$)(P^iPr_3)_2$ moieties of claim 3, wherein the 4,4'-divinylazobenzene-bridged diruthenium complex bearing two $Ru(CO)Cl(P^iPr_3)_2$ moieties is obtained as a yellow solid.

10. The method of making the 1,4-divinylphenylene-bridged diruthenium complex bearing two $Ru(CO)(2$-mercaptoquinolato$)(P^iPr_3)_2$ moieties of claim 3, wherein the 1,4-divinylphenylene-bridged diruthenium complex bearing two $Ru(CO)(2$-mercaptoquinolato$)(P^iPr_3)_2$ moieties is obtained in an about 89% yield.

\* \* \* \* \*